April 28, 1931.  C. ADLER, JR  1,803,291
HIGHWAY CONTROL MECHANISM FOR AUTOMOBILES
Filed Nov. 30, 1926  4 Sheets-Sheet 1

April 28, 1931. C. ADLER, JR 1,803,291
HIGHWAY CONTROL MECHANISM FOR AUTOMOBILES
Filed Nov. 30, 1926 4 Sheets-Sheet 4

Inventor
Charles Adler Jr.
By Charles B. Mann Jr.
Attorney

Patented Apr. 28, 1931

1,803,291

UNITED STATES PATENT OFFICE

CHARLES ADLER, JR., OF BALTIMORE, MARYLAND, ASSIGNOR TO THE ADLER SAFETY CONTROL COMPANY, OF BALTIMORE, MARYLAND, A CORPORATION OF MARYLAND

HIGHWAY CONTROL MECHANISM FOR AUTOMOBILES

Application filed November 30, 1926. Serial No. 151,633.

This invention relates to a trackless highway mechanism for controlling the speed of automobiles on highways at dangerous places; through hamlets or villages, at railroad crossings or other places where it is important that automobiles travel at a reduced speed.

The present application is directed to a trackless highway mechanism, which however, is to be utilized in connection with a mechanism carried on the automobile to control the latter.

The automobile mechanism forms the subject of a separate application for patents filed by me July 28th, 1926, Serial Number 125,552 and therefore claims to that mechanism per se are not included herein.

An object of the present invention is to provide on the trackless highway an improved means by which a mechanism carried on the automobile may be actuated when approaching a place of danger, such as a railroad crossing; cross-roads, sharp curves or any place where safety demands a reduction in the speed of the automobile, and by such actuation cut off or control the power means on the automobile at speeds above a predetermined low speed and to also provide a second means in the highway at a point where it is deemed safe to resume high speed whereby the mechanism on the automobile will again be actuated provided the speed of the automobile has been reduced to place the power means on the automobile in a condition to be operated at speeds above the said predetermined low speed.

A further object of the invention is to provide a trackless highway mechanism embodying the operations above set forth that shall be entirely automatic, and An additional object of the present invention is to provide a trackless highway mechanism which includes what I herein term a high speed setting element and a low speed resetting element whereby a mechanism on the automobile may be set or actuated by the high speed setting element regardless of the speed of that vehicle upon approaching or entering a danger zone and which mechanism on the vehicle will be reset by the low speed resetting element providing the speed of the vehicle has been reduced or brought down to or below a predetermined low speed at the time the automobile passes the low-speed resetting highway element.

In carrying out the present invention, I have found the same is capable of variations in the arrangement of the highway setting and resetting elements and particularly the location or arrangement of that member of the highway mechanism which I herein term the reset element with respect to the surface of the highway or with respect to the mechanism on the automobile when the latter is passing the same.

The accompanying drawings illustrate the invention in its broader aspect, wherein,—

Fig. 5 illustrates a unit of one of the highway elements, the same being shown in perspective.

Fig. 6 shows in a diagrammatic manner an arrangement of the improved highway mechanisms with respect to a place of danger on the highway.

Fig. 7 illustrates in sectional detail an arrangement of high and low speed highway mechanisms with respect to the surface of the highway,—the view being merely diagrammatic, and Fig. 8 shows in sectional detail another arrangement of highway mechanisms with respect to the surface of the highway.

To illustrate the present invention so that its operation may be understood, I have shown the improved highway mechanism and a form of mechanism on an automobile,—the latter however being the subject of another application for patent filed by me and not herein specifically claimed.

The automobile mechanism will be first described and the improved highway mechanism will follow.

Figure 1:
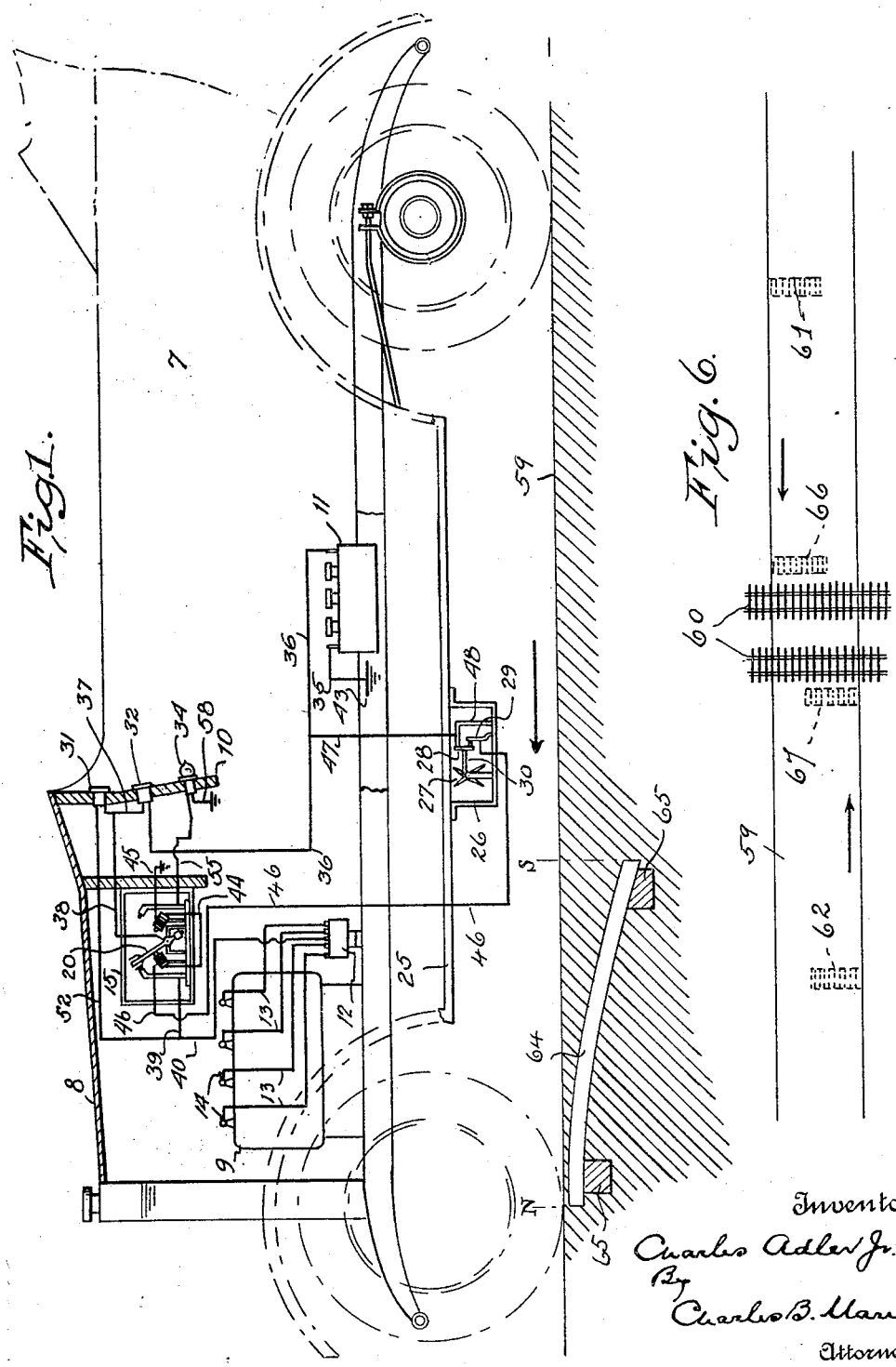
Fig. 1 shows a longitudinal sectional view through the hood portion of an automobile under which the engine or motor is located, with the control means in place on the automobile and also shows a longitudinal section through the highway beneath which one of the highway mechanisms is located.

Referring particularly to Fig. 1 of the drawing, the numeral 7 designates the body of an automobile; 8 the hood which covers the engine or motor 9, and 10 designates the instrument-board or dash.

The usual battery 11 is employed as is also a distributor 12 having connections 13 with the several spark-plugs 14 of the motor 9.

I prefer to provide a case 15 on the automobile in which certain elements or apparatus may be placed and sealed and in the present disclosure, I show this case beneath the hood 8.

In this case 15, as seen in Figs. 1-3 and 4, I locate two electro-magnets 16 and 17 respectively, and associated with the magnet 16, I provide a contact-bar 18 while a similar bar 19 is associated with the electro-magnet 17.

Between the two electro-magnets 16 and 17, I locate a pendulum-like bar 20 on which there are side contacts 21 and 22 respectively, which contacts are so located that when the pendulum-bar is tilted in one position, the contact 21 will engage contact-bar 18 and when said pendulum-bar is swung to its other position, the contact 22 of said bar 20 will engage the contact-bar 19.

The pendulum-bar 20 in this instance is mounted in a bearing bracket 23 between its two ends and the lower end of this bar 20 is preferably provided with an adjusting weight 24, in order that it may be properly balanced to enable it to swing by gravity from the core of one electro-magnet to the core of the other electro-magnet between which magnets said bar will be moved.

In addition to the selective relay which includes the pendulum-bar and the two electro-magnets 16—17 which control it, I make use of an impulse breaker element which I also carry on the automobile and which is actuated by the independent highway elements as each of the latter is passed.

This breaker element may be attached to the automobile at any convenient place such as at the inner side of one of the front wheels or beneath the running board 25.

I prefer to make this attachment to something that is sustained by the springs, such as the body or something carried thereby, because such attachment relieves the breaker element of undue shocks and needless vibrations which it would receive if carried by the axles for example.

In this instance, I therefore show the breaker-device mounted in a case 26 which is carried beneath the running-board 25 and by reference to Figs. 1-3 and 4 of the drawings, it will be seen that this breaker-device in the present instance, includes a pivotally-sustained magnetic needle-bar device 27 and two contact plates 28 and 29,—the needle-bar device 27 being connected by a link 30 with one of the contact plates so that when the needle-bar is momentarily oscillated, it will instantly separate the contact-plates 28 and 29.

In addition to the selective relay, which includes the electro-magnets 16—17 and the pendulum-bar 20, and the devices 27—28—29 of the impulse breaker element, I also use a speed governor 31; an ignition switch 32, and in some instances a signal lamp 34 all of which are diagrammatically illustrated in Figs. 1-3 and 4 of the drawings.

Having described the mechanical structures of the elements involved, I will now proceed to explain the circuits for effecting an operation of those elements on the vehicle.

As is common practice in automobile wiring installations, the battery 11, has one side or terminal grounded to the automobile frame, as for example by a wire 35.

From the other post or terminal, I run a wire 36 to the ordinary ignition-switch 32, which is usually carried on the dash or instrument-board 10.

From the ignition-switch 32, there are wires 37—38 that lead to and connect the bracket bearing 23, which carries the pendulum-bar 20 so that the pendulum-bar will be included in any circuit that includes the wire 38.

Figure 3:
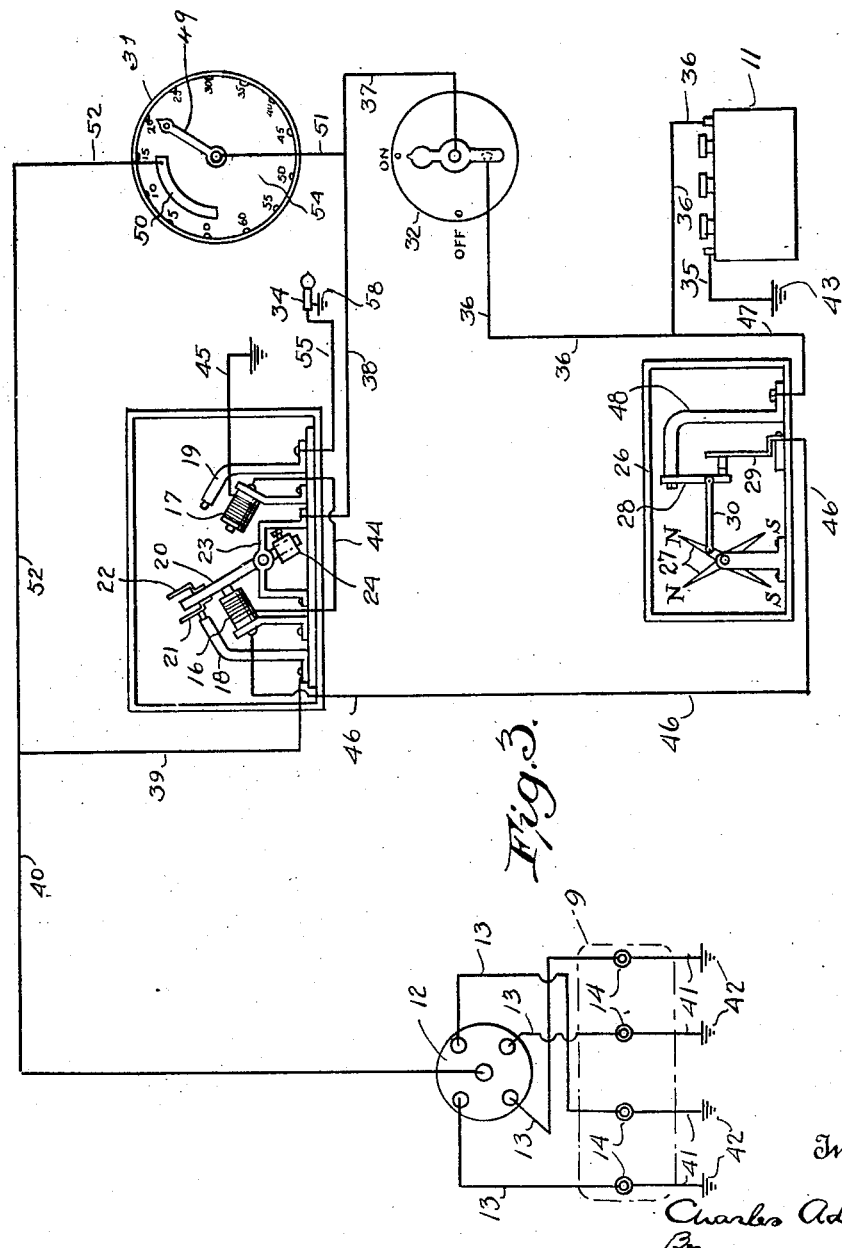
Fig. 3 illustrates, on an enlarged scale, the apparatus and circuits on the automobile, said devices and circuits being in the normal condition.

When the pendulum-bar 20 is attracted by the electro-magnet 16, as shown in Fig. 3, its contact-plate 21, will engage contact bar 18 and from the bar 18 there extend wires 39 and 40 which latter wire connections, in this instance, connect with the distributer 12 of the motor.

It will thus be understood that the battery 11, will have a connection through the ignition switch 32, pendulum-bar 20, contact-bar 18, to the distributor 12 as long as the pendulum-bar is held by magnet 16, as shown in the normal circuit condition in Fig. 3, so that the ordinary operations of the ignition circuit may be carried on between the battery and the spark-plugs 14 of the motor 9.

Thus, under the conditions illustrated in Fig. 3, the automobile may be driven at any desired speed.

The return circuit from the motor 9 to the battery 11 is indicated by the wire 41, the grounds 42 and 43 and the ground wire 35 back to the battery.

It will be noted that the coils of the two magnets 16—17 are connected by wire 44; that magnet 17 has a ground connection 45 and that from magnet 16 there is a wire 46 that leads to and connects with the contact plate 29 of the breaker device.

Another wire 47 connects the main battery wire 36, with the bracket 48 that carries the contact plate 28, which the magnetic needle-bar device 27, momentarily actuates each time a highway device is passed.

It has been pointed out that as long as electro-magnet 16 is energized with the pendulum-bar 20 attracted thereto the main ignition circuit from battery 11 to the distributer 12, and spark plugs 14 will be closed between the contact plate and contact-bar 18. The energization of electro-magnet 16, however is controlled through the breaker device,—the circuit being from battery 11, by wires 36—47 to and through bracket 48 and contact-plate 28 to plate 29; then by wire 46 to and through the coil of magnet 16; then by wire 44 to and through the coil of the other electro-magnet 17 and finally by wire 45 to ground and back to the battery.

It will thus be seen both electro-magnets 16—17 are energized, in the form of apparatus herein disclosed, as long as contact-plates 28—29 are engaged but immediately upon the opening of those plates the circuit from the battery through those magnets will be opened and pendulum-bar 20 will be released so its upper end will swing over toward the core of electro-magnet 17.

Figure 4:
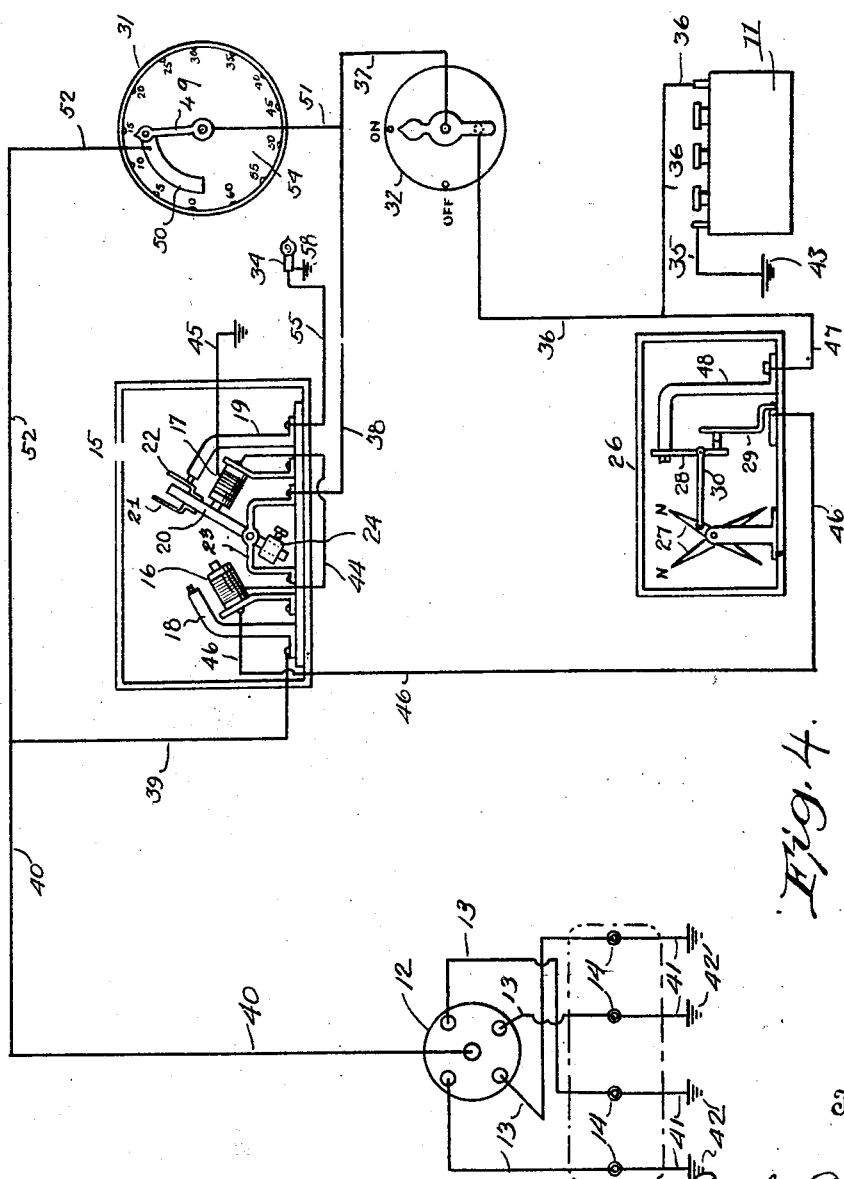
Fig. 4 shows the same but with the parts and circuits in the operative condition to prevent a speed above a predetermined low speed.

The opening of this circuit is but for the instant consumed by the automobile passing the highway element after which the circuit is again closed because the electro-magnets are deenergized for a lesser period than is consumed by the pendulum-bar 20 swinging away from the magnet 16 toward the magnet 17, consequently as the bar 20 approaches the core of magnet 17, the latter will have again become energized so as to attract and hold the bar 20 with contact 22 engaging contact-bar 19 and the apparatus will then be in the position illustrated in Fig. 4 of the drawings.

By referring to Fig. 4, it will be noted that the normal ignition circuit from battery 11 to distributer 12, is interrupted, because contact-bar 18 and contact plate 21 on the pendulum-bar 20 are separated, consequently firing in the cylinders of the motor will stop unless a substitute ignition circuit be provided with the pendulum-bar 20 is held by magnet 17.

A substitute ignition circuit, however, cannot be formed until the speed of the automobile is reduced to a predetermined low speed, consequently, in this instance, there can be no further firing of the charge in any of the motor-cylinders until the speed is reduced to that predetermined speed.

The reason for this is, that the substitute ignition circuit can only be formed through the speed governor 31, but it can only be formed through this speed governor after the speed has been reduced to the predetermined lower speed, at which low speed the governor will act as a switch to close the substitute ignition-circuit.

By again referring to Figs. 3 and 4 of the drawings, it will be noted that the speed switch or governor 31, has a movable contact element 49 and a stationary contact element 50,—the movable element traveling in a direction away from the stationary element 50 as the speed is increased beyond the predetermined low speed point, but moving back toward the stationary element 50 as the speed is decreased.

When the speed is at or below the maximum low speed point,—say from fifteen miles per hour to zero, then the movable contact 49 will engage the stationary contact 50 and by such engagement, close the low speed ignition circuit.

Figure 2:
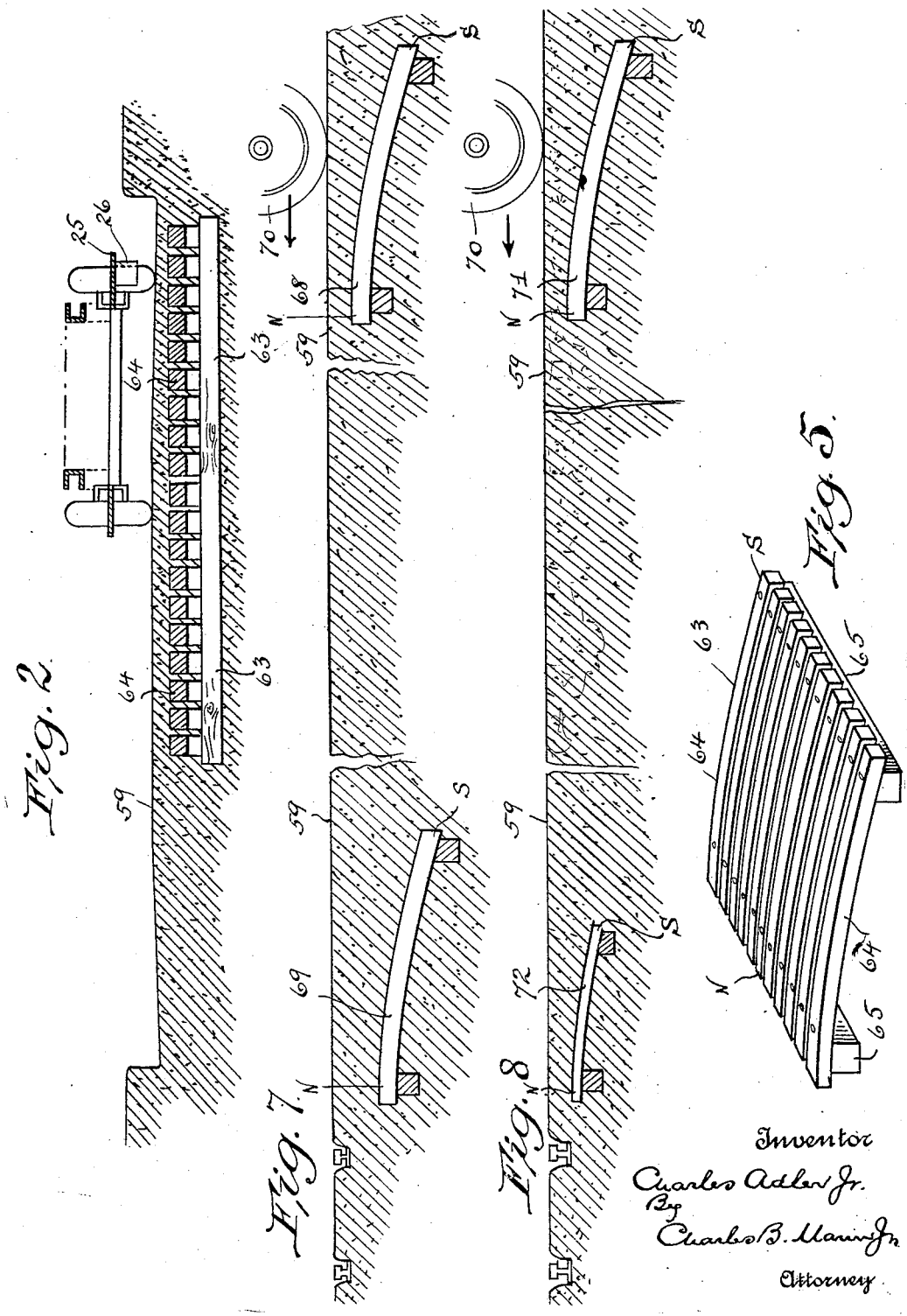
Fig. 2 illustrates a cross-sectional detail through the highway at one of the highway elements and also shows an automobile on the highway.

To accomplish this, I provide a wire 51 from the wire 37 to the movable contact 49, and I provide another wire 52 from the stationary contact to the wire 40 that leads to the distributer 12, consequently as long as the speed is in excess or above the predetermined low speed the movable contact 49 will be disengaged from the stationary contact 50 as in Fig. 2, and a substitute ignition circuit to the motor cannot be formed as long as pendulum-bar 20 is closed with contact bar 19, consequently the firing at the motor stops until the speed is cut down.

When, however, the speed has been reduced to the predetermined low speed, the movable contact 49 will engage the stationary contact 50, and immediately this engagement takes place, the substitute circuit will be formed and firing at the cylinders will take place, but only so long as the low speed is maintained.

In accordance with the present invention, I provide stationary highway elements in the trackless highway to effect an operation of the means carried on the automobile, 1st. to prevent the automobile from being driven above a predetermined speed upon entering a danger zone and 2nd. if the speed of the automobile has been reduced to reset the means on the automobile when it is deemed safe to permit the speed to be increased.

The highway elements are entirely separate and independent of each other in that they have neither mechanical nor electrical connection one with another and each highway element is preferably at all times in an operative or energized condition.

The structure is entirely automatic in that it is actuated to reduce speed and then reset to permit unlimited speed without calling upon the driver of the automobile to manually cooperate, so that continuous control throughout dangerous zones along the trackless highway is automatically provided.

Attention is now directed to Figs. 6–7 and 8 of the drawings in order that an explanation of the improved highway elements may be set forth.

The automobile highway is designated 59 and in this instance, I indicate a danger point or zone by diagrammatically indicating a railroad crossing 60. The danger zone however, may result from a cross-road, a sharp curve, a one-way bridge or the presence of a village or hamlet, but in all cases it is a fixed place of danger and at all times care and slow speed should be exercised in passing therethrough.

At the entrance to this fixed zone of danger and sufficiently spaced from the actual danger point (the railroad or other danger point) I provide setting magnets 61 and 62,—the magnet 61 being utilized for traffic in a direction from right to left and the magnet 62 serving for traffic from left to right.

These magnets are buried in the highway beneath the surface thereof and by reference to Figs. 2 and 6 of the drawings, it will be noted that said magnets extend in a direction crosswise of the highway for a distance preferably more than half-way.

The statement herein that the magnets extend crosswise of the highway does not mean that the bars of which the magnets are formed extend crosswise of the highway but that the magnet-sections so extend.

For example, by reference to Figs. 2 and 5 of the drawing, it will be noted that the magnets are shown as formed in sections 63, with the bars 64 of the sections counted on cross-beams 65 and while the bars extend lengthwise or longitudinally of the highway, the sections are arranged crosswise of the highway so the sections will extend more than half way across the highway.

The bars 64 are magnetized with north and south pole ends and each bar therefore constitutes a magnet in itself.

By again referring to Fig. 6 of the drawing, it will be noted that for each danger zone there is provided a setting magnet 61 or 62 for traffic in each direction and that the magnet 61 extends from one side edge of the highway toward the other side edge and that it extends more than half way across the highway while the magnet 62 begins at the opposite side edge of the highway and also extends crosswise thereof for a distance more than half way.

The impulse breaker element in case 26 on the automobile is located on the right hand side of the automobile so that the driver cannot detour or pass around the end of the magnet sections, even if he knows just where they are located under the surface of the highway.

The magnet sections 61—62 are what I term setting magnets because they are located at the entrance to the danger zone.

Now as to the reset magnets:

In accordance with the invention as disclosed in the present application, I provide a reset magnet for traffic in each direction and while these reset magnets may be located at any place in the highway between the two entrance ends to the danger zone, I have shown one of them 66 at the railroad crossing 60 on the side just before the automobile passes over the tracks and this one constitutes the reset magnet for the setting magnet 61 for traffic in a direction from right to left, as viewed in Fig. 6 of the drawing.

The other reset magnet 67 is located between the setting magnet 62 and the other side of the railroad crossing or other place of danger.

It is to be understood however that the precise location of the resetting magnets is not material to this invention which is dealing only with the fact that the setting magnets will set at either low or high speeds whereas the resetting magnets such as 66 or 67 will reset only at low speed.

This high and low speed setting and resetting will now be explained with reference to Figs. 7 and 8 of the drawing.

It should be understood that the automatic operation takes place as the automobile is driven over the buried magnets by the latter attracting the magnetic needle device 27 of the impulse breaker element in case 26 on the automobile.

I have found in practice that I can cause the needle device 27 to be operated at either low or high speed by one buried magnet while I can so arrange another magnet that said needle device will only be actuated at low speed of the automobile over the magnet.

I have therefore made use of this discovery in the present improvement to prevent a driver from coasting through a danger zone at high speed and getting a reset of means on the automobile as the latter passes over the reset magnet.

By this means, if the driver does coast at high speed through a danger zone and passes over a reset magnet at high speed, he will fail to get a reset of his mechanism and must then stop and reset by hand if he desires to drive at high speed again.

While this high speed setting and low speed resetting may be accomplished in several ways, I have illustrated two ways in the drawings,—one being disclosed in Fig. 7 and the other in Fig. 8, of the drawings.

In Fig. 7, I show a setting magnet 68 at the entrance to a danger zone and I show a reset magnet 69 at the point of danger (the railroad crossing 60) in that zone.

The numeral 70 designates an automobile traveling on the highway from right to left and just passing over the setting magnet 68.

By reference to this Fig. 7, it will be noted that the magnets 68—69 are presumed to be of uniform size but that setting magnet 68, is closer to the surface 59 of the highway than reset magnet 69, therefore when the automobile passes over the setting magnet 68, there is less gap between it and the impulse breaker needles 27 on the automobile than there will be between those same needles and the reset magnet 69 so that this difference in the gap will cause magnet 68 to actuate the needles 27 at either low or high speed, whereas when the magnet 69 is passed, the gap is sufficiently greater to cause an operation of the needle only at a slower or low speed thereover. By this means I obtain a high speed set and a low speed reset magnet.

This is due to the fact that the air gap has been increased to such an extent that the strength of the magnets acting on the needles is thus lessened and at speeds greater than the prescribed limit, the magnets are unable to overcome the inertia of the needles,—at low speeds, however the magnets exert their strength upon the needles for a longer period of time which is sufficient to properly move the needles.

Another way of accomplishing the same result is to utilize a setting magnet 71 as in Fig. 8, of greater power or magnetism than the reset magnet 72, so that the magnet 71 will operate the needles 27 at practically any speed, whereas the reset magnet 72, being of lesser power, will only reset at a lower speed of the automobile thereover.

In this way I may also obtain the high speed setting and low speed resetting magnets.

I have arranged the magnet bars 64 with one end higher than the other,—the high ends being all north pole ends while the low ends are all south pole ends of said magnet bars whereas the needles 27 of the impulse breaker are arranged with their south pole ends lower so as to present those south pole ends to the north pole ends of the highway magnets.

Presuming an automobile to be traveling from left to right on the highway 59 in Fig. 6, immediately upon passing over magnet 62, the north poles or higher ends of the magnet bars will attract the south pole ends of the magnetic needle-bar 27 of the breaker device, and thus oscillate the needle-bars, open contacts 28—29 and momentarily de-energize electro-magnets 16—17 on the automobile.

This operation releases pendulum-bar 20 from magnet 16 and opens the normal ignition circuit at 18—21. The pendulum-bar then swings over toward magnet 17 and while making this movement the magnets become energized again as soon as contacts 28—29 on the breaker close. Consequently, when pendulum-bar 20 approaches the energized magnet 17, the latter attracts and holds it, thereby closing the contact 22 with the bar 19, in readiness to complete a substitute ignition circuit as soon as the speed is reduced, or if the speed has been reduced, because of roadway warning signs, the substitute circuit will immediately be formed through the speed switch contacts 49—50.

The low speed ignition circuit will be maintained until the normal ignition circuit is restored.

The restoration of the normal ignition circuit is effected when the automobile passes over the low speed reset magnet 67 because when this occurs the magnetic needle device 27, will again be actuated,—the electro-magnets 16—17 will again be momentarily de-energized and the pendulum-bar 20 will swing back and be held by electro-magnet 16 so as to automatically restore the normal ignition circuit and permit the automobile to be operated at high or low speed without hindrance.

It will thus be seen that the operation is entirely automatic both as to setting and resetting of the apparatus.

It will further be noted that immediately the ignition circuit is interrupted and the pendulum-bar 20 swings over to contact bar 19, the dash lamp 34 is ignited and the operator at once notified that he is in a low speed zone.

From the foregoing explanation of the highway mechanisms or magnet-units, it is to be understood that the danger zones on the trackless highway are fixed zones of danger in that they are always dangerous for high speed traffic, and that the danger in the highway at one place has nothing whatever to do with a dangerous portion of the highway at some other place.

Neither has a highway magnet-unit installation at one fixed zone of danger any connection, either mechanically or electrically, with a magnet unit installation at some other fixed zone of danger.

It is also to be understood that when the magnet-unit guarding the approach to one fixed zone of danger operates the magnetically-actuated means on the automobile, the motor of the automobile cannot be driven by its power above the predetermined low speed limits because when the automobile attains a speed above the fixed low speed limit, the power of the motor is cut off so that the motor cannot be driven by power above that low speed limit until its control means has been reset.

Having described my invention, I claim:—

In a trackless highway system for automatically controlling automobiles on highways wherein the automobile is provided with a motor, an ignition circuit to normally operate the motor, an ignition circuit-changer included in the normal ignition circuit, a magnetically-operated device for controlling the said circuit-changer and a speed control device with connections for forming a substitute ignition circuit when the automobile is traveling at low speed, all of said devices and circuits being on the automobile, in combination with constantly-energized magnets along the highway at each approach to a fixed point of danger which magnets are of sufficient power to actuate the magnetically-operated device on the automobile while the latter is traveling at any rate of speed from low to high speed and cut off the normal ignition circuit on the automobile and other constantly-energized magnets along the highway beyond each of the first named magnets said other magnets exerting a force to actuate the magnetically-operated device on the automobile only when they are moved over said other magnets at low speed and by such second actuation of said device restore the normal ignition circuit.

In testimony whereof I affix my signature.

CHARLES ADLER, Jr.